United States Patent [19]

Hertel

[11] 3,986,237

[45] Oct. 19, 1976

[54] CUTTING TOOLS

[76] Inventor: Karl Hertel, Oedenberger Strasse 29,, D-8500 Nurnberg, Germany

[22] Filed: Oct. 7, 1975

[21] Appl. No.: 620,500

[30] Foreign Application Priority Data

July 23, 1975 Germany............................ 2532825

[52] U.S. Cl. .................................................. 29/96
[51] Int. Cl.² ............................................ B26D 1/00
[58] Field of Search ......................................... 29/96

[56] References Cited
UNITED STATES PATENTS

| 1,396,180 | 11/1921 | Fors ...................................... | 29/96 |
| 2,779,992 | 2/1957 | Hayes ................................... | 29/96 |
| 3,205,557 | 9/1965 | Frommelt et al. ..................... | 29/96 |

FOREIGN PATENTS OR APPLICATIONS

| 1,028,852 | 4/1958 | Germany .............................. | 29/96 |
| 1,293,525 | 4/1969 | Germany .............................. | 29/96 |

Primary Examiner—Harrison L. Hinson
Attorney, Agent, or Firm—Spencer & Kaye

[57] ABSTRACT

A cutting tool comprising a cutting bit, a tool holder having a cutting bit receiving recess and a clamping member for clamping the cutting bit in the recess of the tool holder. The flank surface of the cutting bit remote from its cutting edge has two recesses therein, the bottom surfaces of which extend inwardly of the cutting bit at an acute angle with respect to a lower, seating face of the cutting bit. Two toe dogs are provided on the clamping member and engage in the recesses of the cutting bit with flat contact with the bottom surfaces of the recesses to position the cutting bit in the cutting bit receiving recess.

14 Claims, 14 Drawing Figures

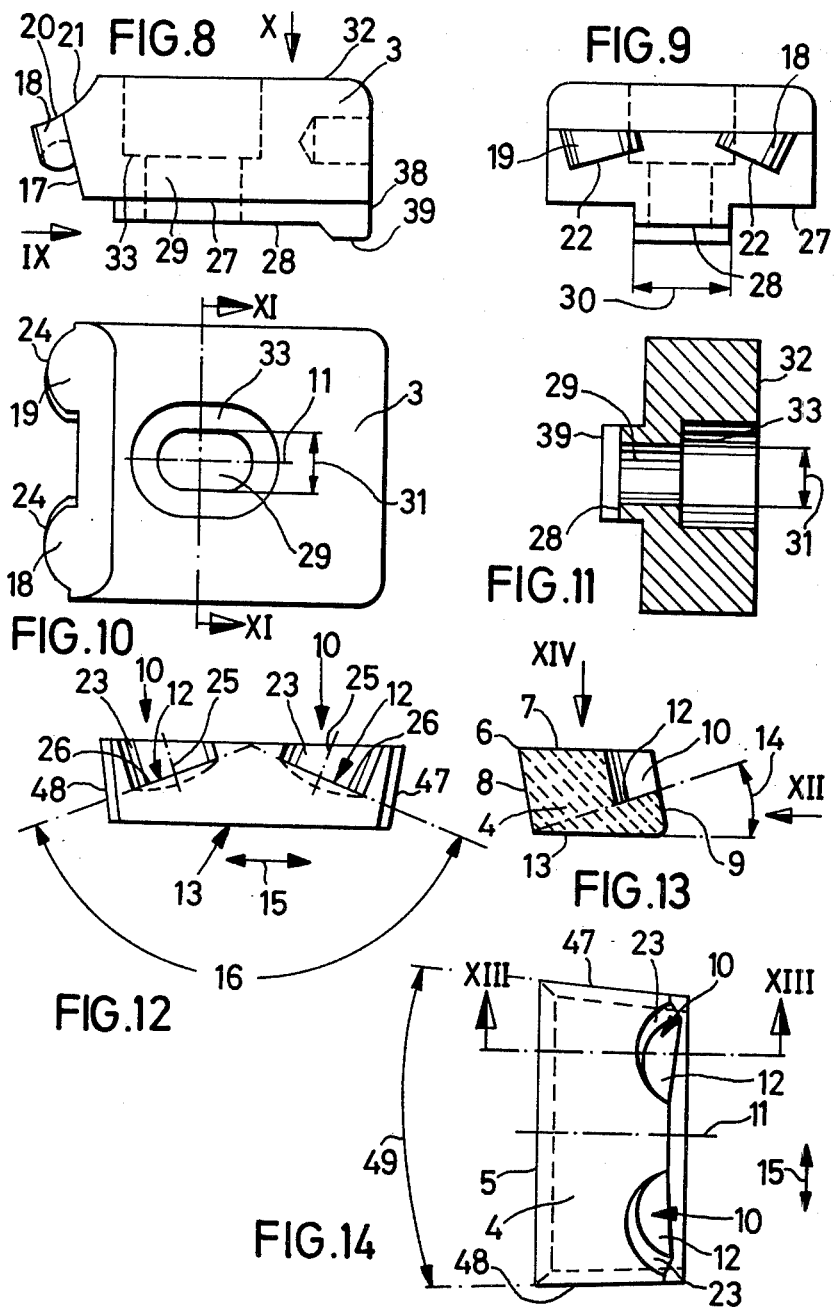

CUTTING TOOLS

The present invention relates to cutting tools and particularly to cutting bits and toolholders for holding the cutting bits.

German Pat. No. 1,293,525 discloses a cutting tool comprising a cutting bit which is clamped into a recess provided on the front of the holder. The bit consists of a hard cutting material, especially if it is to be used for heavy cutting, and has, in vertical section, a rhombus-like cross-sectional shape, a stepped recess being provided in the rear contact face of the cutting bit for receiving a clamping strap or member which is inserted from the cutting side. The clamping member can be reset and fixed in the recess of the holder by means of a fastening screw passing through an elongate slot in the member and also provides a support for the back of the cutting bit.

In this known cutting tool, the stepped recess in the rear contact face of the cutting bit extends over the entire width of the latter. The bottom face of this recess runs parallel to the seating face of the cutting bit. When tightening the clamping strap, it is therefore necessary for the operator always to take particular care that the back of the cutting bit makes full contact with the clamping member otherwise dependable tightening of the cutting bit will not be obtained.

According to one aspect of the present invention there is provided a cutting bit having a rhombus-like vertical cross-sectional shape and comprising upper and lower spaced-apart faces and flank surfaces extending between the upper and lower faces, a cutting edge formed by the junction of the upper face and one of the flank surfaces, and two recesses which open into another of the flank surfaces remote from the one flank surface, the bottom surfaces of the recesses extending inwardly from the other flank surface at an acute angle to the lower face.

According to another aspect of the present invention there is provided a clamping member for clamping a cutting bit having two recesses in a flank surface remote from the cutting edge, in a recess of a toolholder, the clamping member having two toe dogs which in use engage in the recesses in the cutting bit to hold the bit in position as the clamping member is secured to the toolholder.

According to a further aspect of the present invention there is provided a cutting tool comprising a cutting bit, a toolholder having a cutting bit receiving recess therein and a clamping member for clamping the cutting bit in the recess; the cutting bit having a rhombus-like vertical cross-sectional shape and comprising, upper and lower spaced-apart faces and flank surfaces extending between the upper and lower faces, a cutting edge formed by the junction of the upper face and one of the flank surfaces, and two recesses which open in another of the flank surfaces remote from the one flank surface, the bottom surfaces of the recesses extending inwardly from the another flank surface at an acute angle to the lower face; and the clamping member having two toe dogs engaging in the recesses and adapted to make flat contact with the bottom surfaces of the recesses to position the cutting bit in the cutting bit receiving recess.

The provision of two recesses which are open only towards the rear contact surface and optionally to the tool face of the cutting bit results in positive locking of the cutting bit, even under the effect thereon of component forces which point neither in the direction of the back-pressure acting on the cutting edge of the bit nor the direction of the main cutting pressure acting on the cutting bit. This is of particular advantage when there is no additional lateral support for the cutting bit in the recess of the holder. Furthermore, the provision of only two recesses of relatively small volume in the region of the rear contact face of the cutting bit results in a minimum of weakening of the cutting bit's own strength, so that the latter fulfils its purpose, when used for heavy cutting, in an optimum manner. The slope of the bottom faces of the recesses in the direction dipping into the cutting bit results in a dove-tail-like cross-sectional shape of the regions of the cutting bit which are in direct contact with the doe dogs of the clamping strap, so that, when the toe dogs of the clamping strap are tightened, the cutting bit is not only drawn in the direction towards the bottom of the recess of the holder, but is also drawn backwards in the direction towards the clamping strap.

The bottom faces of the recesses may be mutually inclined in the longitudinal direction of the rear contact face of the cutting bit to provide for addtional locking of the cutting bit against lateral shift, say in the direction of the main cutting edge of the bit.

The side faces of the recesses may approximately have a part-cylindrical shaped surface and, correspondingly, the toe dogs of the clamping member may have the outline shape of a sector of a cylinder, with the cylinder axes perpendicular to the bottom faces of the recesses. The provision of such recesses ensures that weakening of the cross-section of the cutting bit by the recesses is extremely slight.

A spline-like projection may be provided on the underside of the clamping member, which projection serves to increase the strength of the region which is particularly stressed by the fastening screw which passes through an elongate slot extending longitudinally of the clamping member. Thus, the spline-like projection may be regarded as forming the spine of the clamping member. The spline-like projection may include a downwardly extending extension at an end opposite the end facing the cutting bit. The extension ensures that the bottom of the clamping member and the bottom of the spline-like projection, away from the extension, are free with respect to the bottom of the recess in the holder and, when the fastening screw passing through the slot is tightened, the surface of the extension thus acts, in a manner of speaking, as a swivel bearing for the motion of the clamping member. This motion then is a rotatory motion which is particularly favourable for reliable tightening.

A groove may be provided in the bottom of the recess of the toolholder into which the spline-like projection is slidably movable. With such an arrangement the spline-like projection simultaneously serves for guiding purposes and for locking the clamping member against lateral shift. Such locking is of particular advantage when the cutting tool is used for a neck turning tool.

Alternatively the recess in the toolholder may have a lateral wall as well as end wall and a planar bottom so that the cutting bit and the clamping member can be used without altering their shape, not only for neck turning tools, but also for roughing tools. When the clamping member is used in such a roughing tool, the extension of the spline-like projection sits on the bottom of the recess on the holder. This seating of the clamping member which in a manner of speaking is pointlike, enables the clamping member to be mounted in such a way that it can move not only in the direction of its central longitudinal plane, but also transversely thereto, so that it can follow the particular geometrical features at the holder and at the cutting bit in an optimum manner, in the sense that as far as possible over-rigid tightening of the cutting bit is avoided.

The present invention will now be described, by way of example, with reference to the accompanying drawings, wherein:

FIG. 8 is an elevation view of the clamping strap or member;

FIG. 9 is a front view of the clamping member shown in FIG. 8 as viewed in the direction of the arrow IX in FIG. 8;

FIG. 10 is a plan view of the clamping member shown in FIG. 8, as viewed in the direction of the arrow X in FIG. 8;

FIG. 11 is a section on the line XI—XI in FIG. 10;

FIG. 12 is a rear elevational view of a cutting bit as viewed in the direction of the arrow XII in FIG. 13;

FIG. 13 shows a vertical section along the line XIII—XIII of FIG. 14, and

FIG. 14 shows a plan view on the cutting face of the cutting bit as viewed in the direction of the arrow XIV in FIG. 13.

Figure 1:
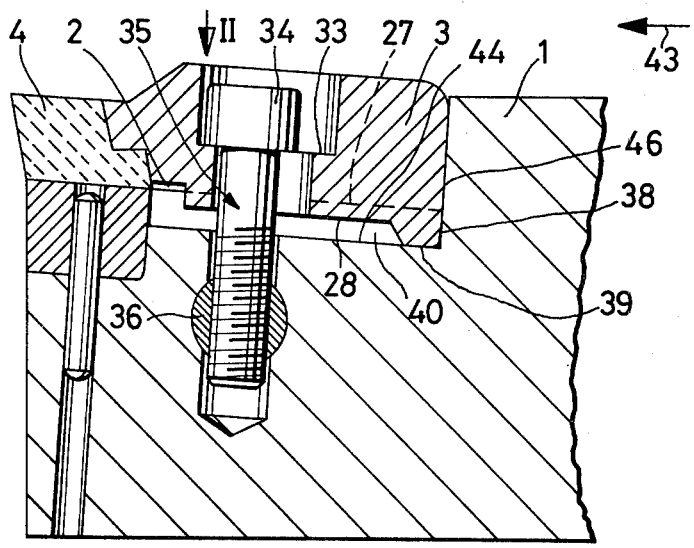
FIG. 1 shows a vertical section through a portion of a neck turning tool, along the line I—I of FIG. 2.
Figure 2:
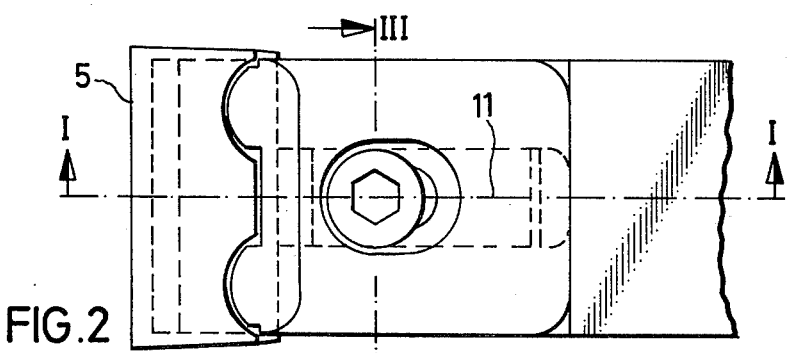
FIG. 2 shows a plan view on the neck turning tool shown in FIG. 1, viewed in the direction of the arrow II.
Figure 3:
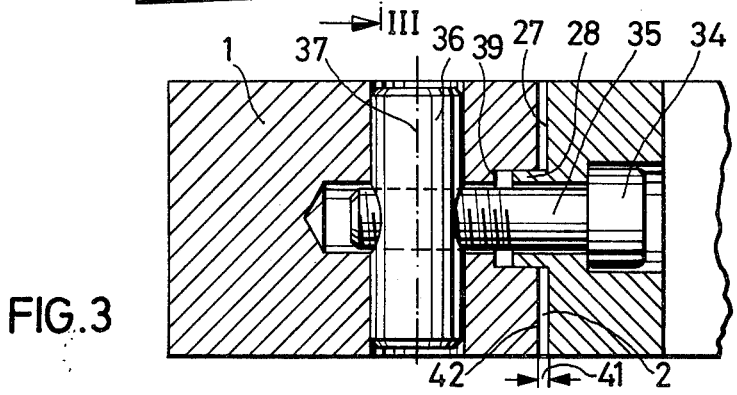
FIG. 3 shows a section along the line III—III in FIG. 2.
Figure 4:
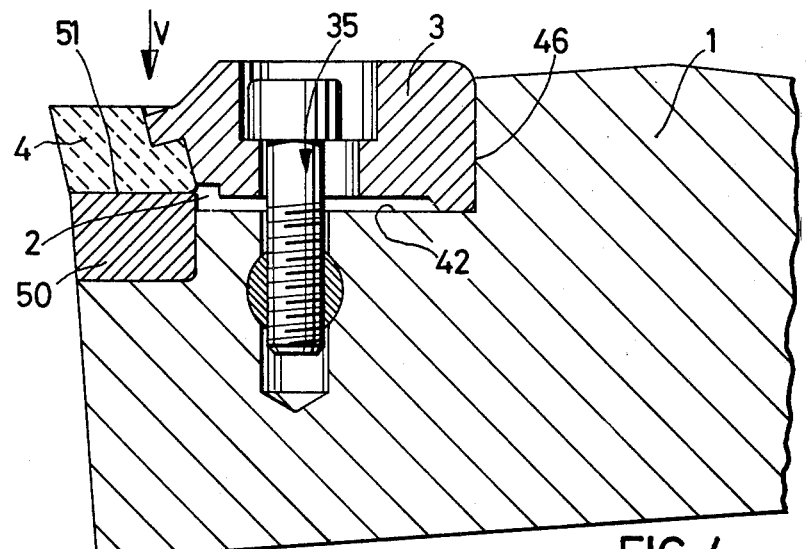
FIG. 4 is a vertical section through a roughing tool along the line IV—IV of FIG. 5.
Figure 5:
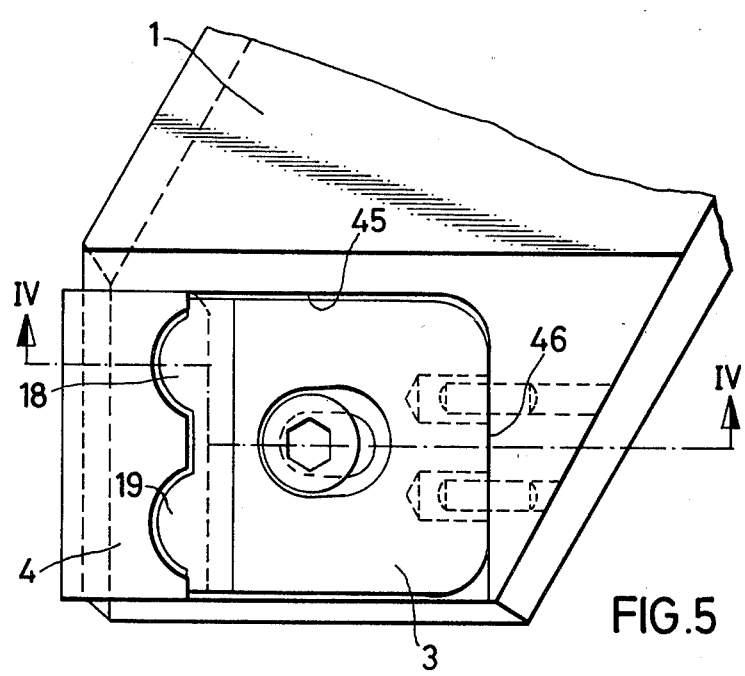
FIG. 5 is a plan view of the front part of the roughing tool shown in FIG. 4, as viewed in the direction indicated by the arrow V in FIG. 4.
Figure 7:
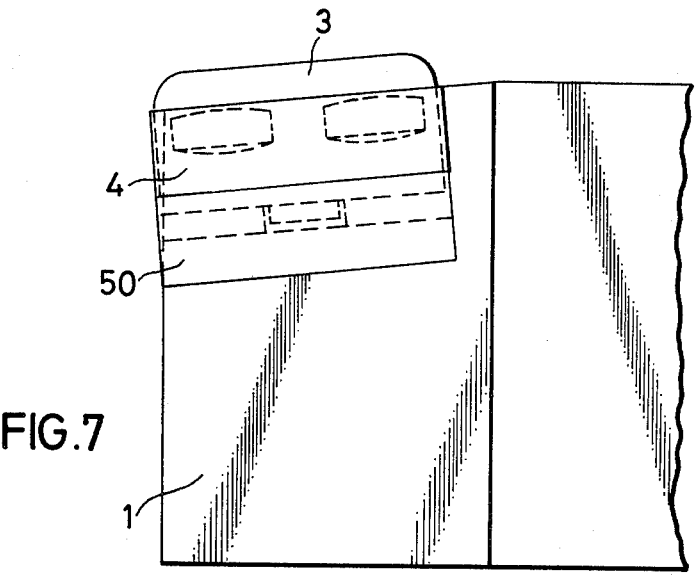
FIG. 7 shows a front elevational view of the roughing tool as viewed in the direction of the arrow VII of FIG. 6.
Figure 6:
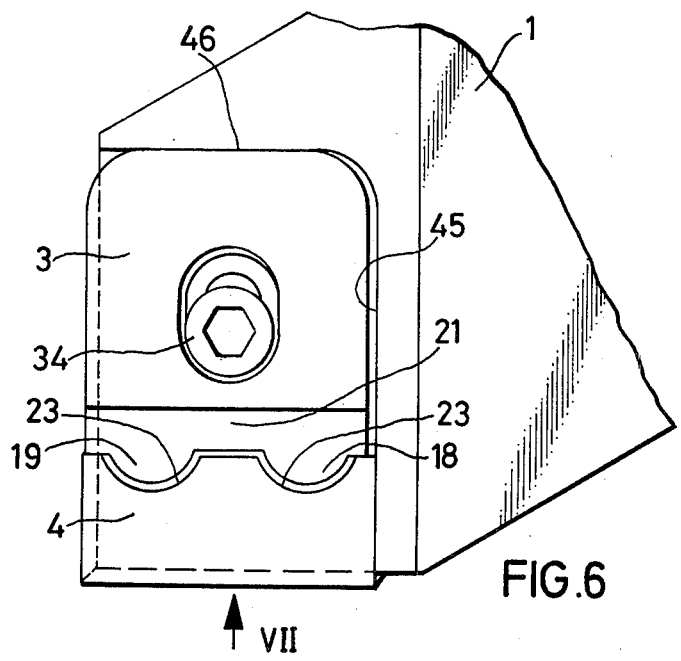
FIG. 6 shows a plan view of a roughing tool which, in contrast to FIG. 5, is a left-hand cutting tool as opposed to a right-hand cutting tool.

Referring initially to FIGS. 1 to 3, there is a frontal opening or recess 2 in the holder at the front end of the holder shank 1 on the neck turning tool. A clamping member 3 and a cutting bit 4 are located inside the recess 2 on the holder. The cutting bit 4 consists of a hard cutting material, for example sintered carbide. The illustrated cutting tool which is clamped in position on a machine, such as a lathe is intended particularly for use in heavy cutting.

The cutting bit 4 has a rhombus-like cross-sectional shape (FIG. 13). The tip of the rhombus which forms a main cutting edge 5 is designated as 6. The cutting edge 5 is formed by a top or tool face 7 and a flank or side face 8.

Two stepped recesses 10 are provided in a rear contact face 9 of the cutting bit 4. The two transversely separated recesses 10 are provided in the cutting bit 4. Their positions are symmetrical to the vertical central longitudinal plane 11 of the cutting bit 4 and the clamping member 3. The recesses 10 are open towards the tool face 7 and the rear contact face 9 of the cutting bit 4. The bottom faces 12 of the recesses 10 form an acute angle 14 with the bottom or seating face 13 of the cutting bit, which angle converges in the direction interiorly of the cutting bit 4. The bottom faces 12 of the recesses 10 are mutually inclined not only in the direction XIV (FIG. 13) dipping into the recess 10, but also in the longitudinal direction 15 of the rear contact face 9 (FIG. 12). The bottom faces 12 therefore form an obtuse angle 16 with one another, which opens towards the seating face 13 of the cutting bit.

The clamping member 3 has a front contact face 17 which supports the area of the rear contact face 9 of the cutting bit 4. For this purpose, the front contact face 17 of the clamping member 3 is inclined at an angle corresponding to the inclination of the rear contact face 9 of the cutting bit 4. The toe dogs 18, 19 protrude from the contact face 17. The rearward extending upper faces 20 of the toe dogs 18, 19 and the upper front face 21, adjacent thereto, of the clamping member 3 have a concave shape to serve as chip deflection surfaces. The front face 21 of the clamping member 3 extends upwards beyond the toe dogs 18, 19. The pressure-applying surfaces 22 of the toe dogs 18, 19 are aligned so that they rest in a plane-parallel manner on the bottom faces 12 of the recesses 10 of the cutting bit 4, when the clamping member 3 is tightened.

The side faces 23 of the recesses 10 have an approximately part-cylindrical shape. Accordingly, the toe dogs 18, 19 also are provided with a part-cylindrical outline shape 24 which, however, has a cylinder diameter smaller than that of the part-cylindrical recesses 10. The axes 25 of the cylinder shape of the side faces 23 of the recesses 10 are perpendicular to the abutting edges 26 formed by the junctions of the bottom faces 12 of the recesses 10 with the rear contact face 9 of the cutting bit 4 and, also are perpendicular to the bottom faces 12.

The bottom 27 of the clamping member 3 is provided with a spline-like projection 28. The projection 28 extends in the direction of an elongate slot 29, the longitudinal axis of which lies in the central longitudinal plane 11 of the clamping member 3 and extends from top to bottom through the clamping member and through the projection 28. The spline-like projection 28 also extends symmetrically to the central longitudinal plane 11, in the longitudinal direction of the latter. The spline-like projection 28 has a width 30 which is larger than the width 31 of the elongate slot 29. The central longitudinal axis of the elongate slot 29 also lies in the central longitudinal plane 11. The toe dogs 18, 19 are also arranged symmetrically one on either side of the central longitudinal plane 11. The end of the elongate slot 29, facing the upper surface 32, is widened in such a way that a shoulder 33 is formed for receiving a head 34 (FIG. 1) of a fastening screw 35. The shaft of the fastening screw 35 goes through the elongate slot 29 and engages with a thread in the holder 1. This thread is cut internally into a bush 36 which extends through the holder 1, transversely to the axis of the fastening screw 35 and is provided, transversely to its longitudinal axis 37, with a threaded bore for screwing in the thread of the fastening screw 35. If the fastening thread for the screw 35 is stripped, the bush 36 with the internal thread can be replaced in this way. Complete replacement of the holder 1 is not necessary.

An end 38 of the spline-like projection 28, facing away from the cutting bit 4, is provided with a downwardly protruding extension 39. In the case of a neck turning tool, the spline-like projection 28 rests in a guide groove 40, which extends in the resetting direction 43 (FIG. 1) in the bottom of the recess 2 on the holder. The central longitudinal plane of the guide groove 40 is identical to the central longitudinal plane 11. The bottom 27 of the clamping member 3 is spaced by a distance 41 from the bottom 42 of the recesss on the holder. The spline-like projection 28 makes contact with the bottom 44 of the guide groove 40 only through the extension 39.

In the embodiments of the roughing tools shown in FIGS. 4 to 7, the recess 2 on the holder has a lateral contact face 45. The bottom 42 of the recess 2 on the holder is planar throughout. The area of the rear face 46 of the clamping member 3 is supported against the holder 1, if necessary, with the insertion of spacers (not shown). The fastening screw 35, the principle of fastening the fastening screw 35, the clamping member 3 and the cuttinhg bit 4 are, for the embodiment of the left-hand cutting or right-hand cutting roughing tool (FIGS. 4 to 7), identical to the embodiments previously described with reference to the other figures. To enable the cutting bit 4 to be used either as a neck turning tool or as a roughing tool, the flanks 47, 48 of the cutting bit, adjacent to the flank 8 of the main cutting edge 5, make an acute angle 49, which converges in a direction opposite to the direction of the arrow 43, that is to say in the direction towards the rear end of the holder 1, with the flank 8 of the main cutting edge 5.

Inside the recess 2 of the holder, the cutting bit 4 rests on the surface of a shim 50 which is replaceably mounted on the holder 1. The upper face 51 of the shim 50 is at a level higher than that of the bottom 42 of the recess 2 of the holder.

I claim:

1. In a cutting tool including a tool holder; means defining a frontal opening in the tool holder; a cutting bit accommodated in the frontal opening of the tool holder and having a rhombus-like vertical cross-sectional shape, as well as a seating face, a tool face and a rear contact face; a clamping member having a frontal contact face being in engagement with the cutting bit; means defining an elongated opening in the clamping member; and a fastening screw passing through the elongated opening and threadedly received in the tool holder for adjustably tightening the clamping member to the tool holder whereby the cutting bit is clamped by the clamping member in the frontal opening of the tool holder; the inmprovement comprising means defining two spaced recesses in said rear contact face of said cutting bit; each recess being open towards said rear contact face; each recess having a bottom face inclining at an acute angle towards said seating face; the direction of inclination of the bottom faces being oriented inwardly of said cutting bit from said rear contact face; and two spaced toe dogs forming part of said clamping member and being arranged at said frontal contact face of said clamping member, said toe dogs being in a face-to-face contact with the bottom faces in said recesses of said cutting bit.

2. A cutting tool as defined in claim 1, wherein said recesses are open towards said tool face of said cutting bit.

3. A cutting tool as defined in claim 1, wherein each said recess has a concave side face of the configuration of a partial cylinder, said partial cylinder having a cylinder axis being perpendicular to the bottom face of the respective recess; each said toe dog having a convex outline of the configuration of a partial cylinder; the convex outline of each said toe dog substantially conforming to the concave side face of the respective recess in said cutting bit.

4. A cutting tool as defined in claim 1, wherein said frontal opening of said tool holder has a rear wall and said clamping member has a rear face being in a face-to-face contact with said rear wall.

5. A cutting tool as defined in claim 1, wherein said frontal opening of said tool holder has a rear wall and said clamping member has a rear face being in a face-to-face engagement with said rear wall with the interposition of at least one spacer member.

6. A cutting tool as defined in claim 1, wherein said cutting bit further has a side face defining, with said tool face, the main cutting edge of the cutting bit; and two flank faces each bounding said side face; each said flank face being arranged at an acute angle with respect to said side face.

7. A cutting tool as defined in claim 1, wherein each toe dog has a rearward extending upper face and said clamping member has an upper front face adjoining the upper faces of said toe dogs; said upper faces of said toe dogs and said upper front face of said clamping member having a concave configuration to constitute chip deflecting surfaces; said upper front face of said clamping member extending upwards beyond said toe dogs.

8. A cutting bit as defined in claim 1, wherein said bottom faces of the recesses are mutually inclined in the longitudinal direction of said rear contact face.

9. A cutting bit as defined in claim 8, wherein said bottom faces of said recesses are inclined at an obtuse angle with the respect to each other in the longitudinal direction of said rear contact face, said obtuse angle opening in a direction towards said seating face of the cutting bit.

10. A cutting tool as defined in claim 1, further comprising a spline-like projection provided on an underside of said clamping member and extending parallel to said elongated opening and wherein said spline-like projection is located symmetrically to a central longitudinal plane of said clamping member in the longitudinal direction of the latter; said spline-like projection being wider than the width of said elongated opening; said elongated opening having a central longitudinal axis lying in said central longitudinal plane and said toe dogs being symmetrically arranged on either side of said central longitudinal plane.

11. A cutting tool as defined in claim 10, further comprising a downwardly protruding extension of said spline-like projection at an end of said clamping member remote from said frontal contact face from which said toe dogs project.

12. A cutting tool as defined in claim 10; said frontal opening of said tool holder having a base; further comprising a guide groove provided in said base and extending in a resetting direction of said cutting bit; said spline-like projection being located in said guide groove.

13. A cutting tool as defined in claim 12, further comprising a downwardly protruding extension of said spline-like projection at an end of said clamping member remote from said frontal contact face from which said toe dogs project; said spline-like projection being in contact with a bottom of said guide groove solely by means of said extension for providing a space between the underside of said clamping member and the base of said frontal opening.

14. A cutting tool as defined in claim 1, wherein said frontal opening of said tool holder has a lateral contact surface and a base which is planar throughout.

* * * * *